May 18, 1926.

R. ERBAN 1,585,140

GEARING FOR TRANSMITTING ROTARY MOTIONS

Filed Nov. 27, 1922　　2 Sheets-Sheet 1

Inventor:
Richard Erban
By *(signature)*
Atty.

May 18, 1926.

R. ERBAN

GEARING FOR TRANSMITTING ROTARY MOTIONS

Filed Nov. 27, 1922  2 Sheets-Sheet 2

Inventor:
Richard Erban
By [signature]
Atty.

Patented May 18, 1926.

1,585,140

UNITED STATES PATENT OFFICE.

RICHARD ERBAN, OF VIENNA, AUSTRIA.

GEARING FOR TRANSMITTING ROTARY MOTIONS.

Application filed November 27, 1922. Serial No. 603,418. REISSUED

My invention relates to a gearing for transmitting rotary motion by a series of rolling bodies moving in a manner resembling that of planet wheels, or in which the race rings may rotate in opposite directions, and in which the pressure exerted by the rolling bodies is proportional to the circumferential force.

In order to realize the last named condition, it has been proposed to split one of the race rings and to expand or contract it responsive to the circumferential force or torque. This, however, results in a discontinuity of the race surface interfering with the smooth running of the gearing; moreover the uniformity of the charge coming on the rolling bodies is not reliably obtained in the gearings known heretofore.

The present invention relates to a gearing of the class referred to, in which the proper ratio between the pressure exerted by rolling bodies on the race surfaces and the circumferential force is obtained by mounting one or both race rings loosely on their shaft and causing them to revolve with the shaft by the interposition of a pressure exerting device producing an axial component acting to force the rolling bodies against their race rings and proportional to the torque.

Further, the invention consists in providing means for exerting a uniform pressure on the rolling bodies. This result is obtained by making the race rings or race ring systems freely adjustable relatively to each other; the adjustment may be effected by various means such, for instance, as spherical race surfaces as usual in ball bearings, or by wedges, inclines or the like.

The annexed drawing illustrates, by way of example, several embodiments of the present invention.

Figure 1:
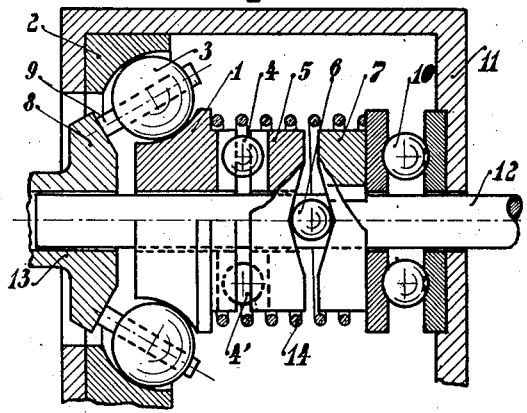
Fig. 1 shows an embodiment of the gearing with one set of balls and undivided race rings in longitudinal section partly in elevation.

Fig. 1 shows an embodiment of a race ring provided with rolling bodies spherical in shape and capable of adjustment by inclines which at the same time serve as pressure devices. The inner race ring 1 is mounted loosely on its shaft 12, the outer race ring 2 being secured to the casing 11. Provided between the two race rings are rolling bodies 3 in the shape of balls, which while moving in the manner of planet wheels actuate studs 9 projecting from a flange 8 on a shaft 13 thereby revolving the latter. The required pressure between the rolling bodies and the race rings is produced by inclines and co-operating balls 4, 4', 6, the race ring 1 and the face of the incline ring 5 adjacent thereto being provided with recesses having sides, symmetrically arranged and inclined toward the axis of the shaft, balls being interposed between the recesses in the race ring and the incline ring as shown in Fig. 1; in some cases it may be preferable to make the recesses asymmetrical. On the other side of the incline ring 5 there is provided another incline ring 7 revolving with the shaft 12 but adapted to slide axially thereon. The axial pressure exerted on the ring 7 is transmitted through the ball bearing 10 to the casing 11 acting in turn on the outer race ring 2 so that all axial forces are taken up by the gearing itself, and the shafts 12 and 13 are under no axial strain. A spring 14 is provided to produce a slight initial pressure required for starting.

Figure 2:
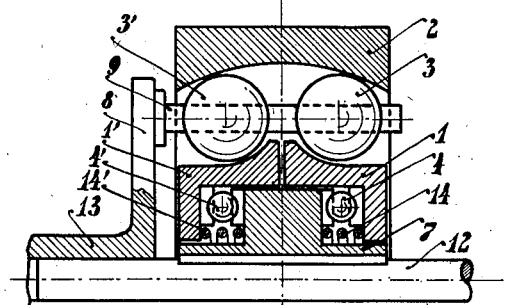
Fig. 2 is a similar view of an embodiment comprising two sets of balls and a divided inner race ring.

Instead of the axial pressure being taken up by a bearing which involves losses, it may be utilized for producing the required pressure in another system of race rings and rolling bodies symmetrical to the system 1, 2, thus securing a doubled effect with no increase in losses. Fig. 2 shows such an embodiment in which, however, instead of an incline ring a spherical race is used. 1, 1' is the divided inner race, having a spherical race surface for obtaining a free self adjustment of the two systems 1, 1' and a uniform strain on all the balls even in case of slight inaccuracies; 3, 3' are the spherical rolling bodies bearing on the studs 9 projecting from the flange 8 of the hollow shaft 13; these studs may carry rollers on which the balls 3 act in order to reduce friction.

The required pressure between the balls and the race rings is produced by inclines and balls 4, 4' interposed between the race rings 1, 1' and the opposed sides of the driving ring 7. Two springs 14 and 14' produce the initial axial pressure. The race rings 1, 1' are freely movable axially on the shaft 12 and the driving ring 7 revolves with this shaft. Also in this case both shafts 12, 13 are free from any axial thrusts and transmit only torques.

Figure 3:
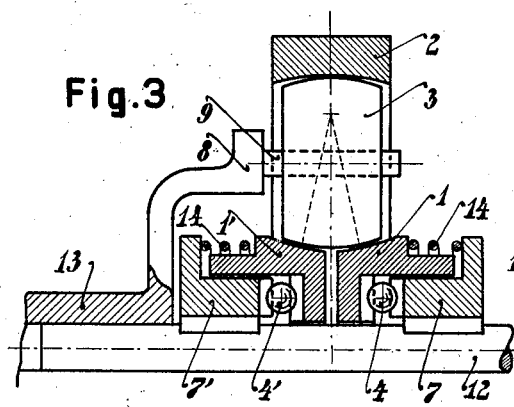
Fig. 3 is a similar view of an embodiment having rolling bodies in the form of rollers, one divided and one undivided race ring.

The construction shown in Fig. 3 is preferable for great leverages; it differs from the construction shown in Fig. 2 in that the driving ring 7 is divided into two halves, adapted to be moved towards each other for increasing the pressure. The rolling bodies are spherical in shape and are free to revolve on the studs 9. This construction may also be used for ball bearings.

In all the embodiments above described, the shaft 13 may be held stationary and the outer race ring or rings may be caused to revolve, in which case the shaft 12 will be the driven shaft.

Figure 4:
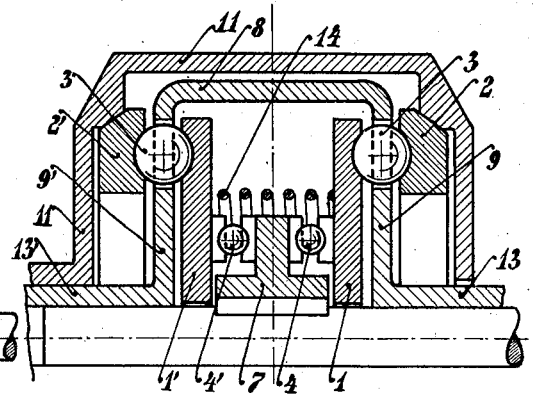
Fig. 4 shows a further embodiment with symmetrically arranged sets of balls and a pressure device provided between the same.

Fig. 4 shows another embodiment of the gearing which besides acts differentially without requiring any thrust bearing for taking up the axial pressure between the race rings and the rolling bodies. The two inner race rings 1, 1' are forced apart by the driving ring 7 and the inclines 4, 4' are in proper proportion to the torque, thereby exerting pressure on the rolling bodies 3, 3' which thus roll on the outer race rings 2, 2' actuating the studs 9, 9' on the shafts 13, 13'. The outer race rings are secured in the casing 11 and the driving ring 7 is fast on the shaft 12; the spring 14 provides for the initial pressure between the rolling bodies and race rings. For securing the free adjustment the outer rings 2, 2' have a spherical race surface, but this result may be secured by any other of the means above described. When the shaft 13, 13', is directly driven by a motor, it drives in turn the shaft 12 and the casing 11, thus producing differential action.

In all these cases, instead of spherical rolling bodies also conical, double conical, cylindrical or others may be used provided that the race surfaces be correspondingly shaped and the leverage or ratio of the angular velocities of the driving and driven shaft may be varied. The automatic adjustment of pressure between the race rings and the rolling bodies above described may be applied to any well-known variable speed friction gearing and more particularly to such gearings of this class comprising a set of double cones between four race rings, or having rocking rollers between race rings having concave generatrices. Or any ball or roller bearing may be converted into a self adjusting friction gearing by providing it with one or more pressure devices.

Figure 5:
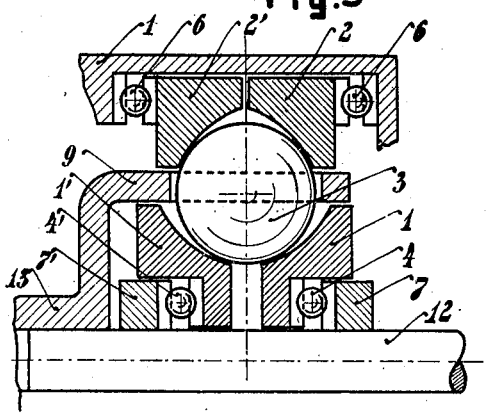
Fig. 5 is a similar view of an embodiment particularly suitable for variable speed ratios and provided with two divided race rings having generatrices of different radii of curvature.

Fig. 5 shows such a construction in which one set of balls rolls between four race rings of which 1 and 1' are the outer and 2, 2' are the inner ones; 3 is one of the balls, 4, 4' are the outer and 6, 6' the inner pressure exerting devices; 12 is the driving shaft, 9 are the studs arranged in the manner of a ball cage and preferably consisting of bolts with rollers revolving thereon to avoid sliding friction. To support the ball on four points in angular race grooves and divide the race rings for adjusting purposes is well known in ball bearings. On adjusting the race ring halves relative to each other, the radii of the circles along which the balls roll on the race ring halves are varied, whereby the leverage is varied as is well understood. If therefore in this case it is desired to secure the proper pressure between the balls and race rings for all leverages, the pressure exerting devices must permit the production of a pressure varying as the balls rise on the inclined surfaces of the race rings. This one can accomplish by making variable the inclination of the surfaces on which the balls 4 and 6 bear, for instance, by making these inclined surfaces in the form of helical surfaces having a variable pitch.

Figure 6:
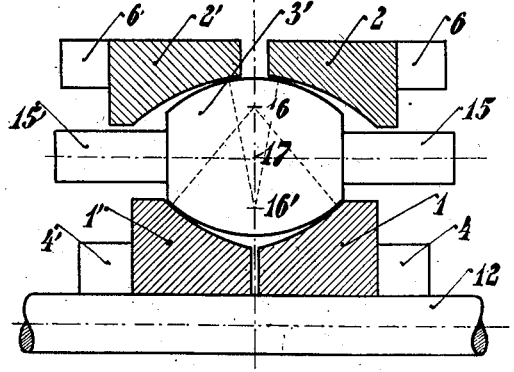
Fig. 6 is a similar view of an embodiment comprising rollers having a convex generatrix.

In the same way a roller bearing having rollers with convex generatrices as shown in Fig. 6 may be used as a variable speed gearing. This construction closely resembles that shown in Fig. 5, therefore the stud carrier is omitted and the pressure exerting devices are merely indicated by their positions at 4, 4' and 6, 6'.

An important feature, however, is that the centre of curvature 16, 16' of the generatrix of the roller is about in the middle between its centre 17 and the periphery of its greatest circle, in order to secure that the roller axis 15, 15' may adjust itself as reliably as possible parallel to the shaft 12.

In Figs. 5 and 6 two of the pressure exerting devices, for instance 4 and 4' or 6 and 6', may be dispensed with, in which case the race rings have to be adjusted relatively to each other by screws or the like. In all the embodiments shown in Figs. 2 to 6 only one pressure exerting device may be sufficient, no matter where it is located.

In Figs. 7 to 18 some of the most important embodiments of pressure exerting devices are shown which are based on the use of balls between incline rings. Instead of balls also cylinders, cones or other revolving bodies may be used, provided the incline rings be correspondingly shaped. Furthermore cams, levers, toggle levers or the like may be interposed between the pressure exerting rings in such a manner, that, when such rings turn relative to each other an axial force is set up.

In all the Figs. 7 to 18, 5 and 7 are the pressure exerting or incline rings or their active surfaces, as the rings may be made integral with some other parts of the structure. 6 are the rolling bodies interposed between the pressure exerting rings.

Figure 7:
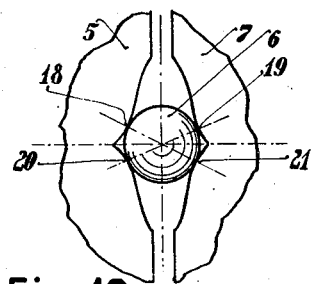
Figs. 7 to 18 illustrate various embodiments of the pressure exerting device.
Figure 8:
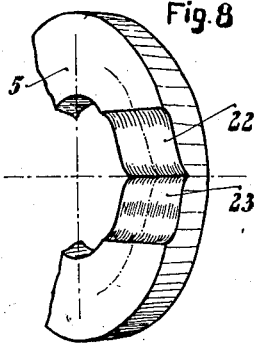
Figure 9:
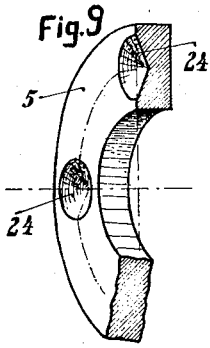

In Fig. 7 a section of the pressure exerting rings on the dash and dot line Fig. 8 is shown along which the rolling bodies roll on the said rings. 18, 19, 20 and 21 are the contact points of the balls 6 with the rings 6 and 7. On turning one ring relative to the other round their common axis the ball rolls along the curves shown forcing the rings apart; the axial force exerted thereby on the rings depends on the form of the curves. In Fig. 7 only a diagrammatic form is shown. The surfaces on which the balls roll may be of various shapes, the rolling curves remaining always the same.

Figure 10:
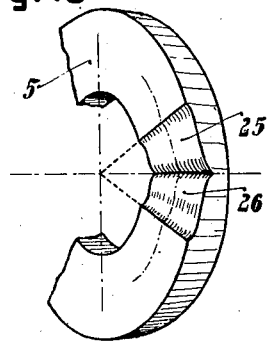
Figure 11:
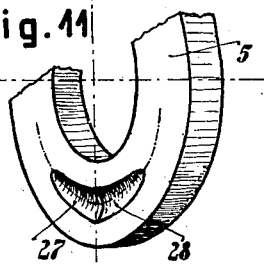
Figure 12:
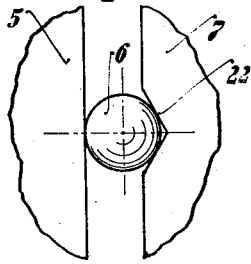
Figure 13:
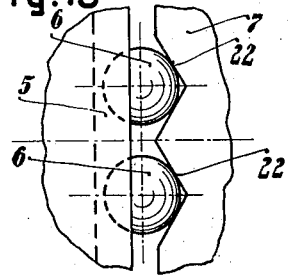
Figure 14:
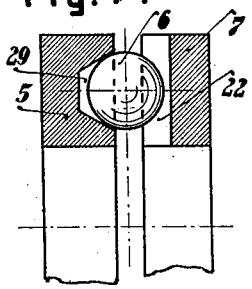
Figure 15:
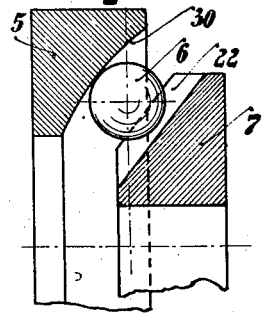

The shape of the surfaces may be selected according to the strain or pressure to be exerted on the ball taking into account also the easy manufacture of these surfaces. In Fig. 8 plane or curved pressure surfaces or inclines 22, 23 are shown and in Fig. 9 a conical surface 24, the generatrix of which may be straight or curved. Fig. 10 shows two helical surfaces 25, 26 and Fig. 11 two inclined or oblique toroid surfaces 27, 28. In Fig. 7 both incline rings have the same shape, but in some cases it may be desirable to make them different in shape. When more than two pressure rollers or balls are to be used with the rings, the construction shown in Figs. 12 to 15 permits to obtain a snug fit of all the balls, independent of the accuracy of the distribution of the inclines on the faces of the rings; in Fig. 12 the ring 5 has a plane face while the ring 7 is provided with inclines 22. In order to reliably prevent the ball 6 from sliding on the ring 5 under all conditions, the ring 5 is provided with a groove 29 as shown in Figs. 13 and 14. For the same purpose the surfaces may also be shaped as shown in Fig. 15, where the ring 5 has an inclined concave face 30 and the ring 7 a conical face provided with inclines 22.

Figure 16:
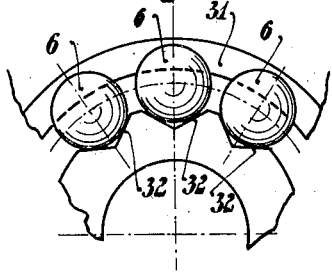
Figure 17:
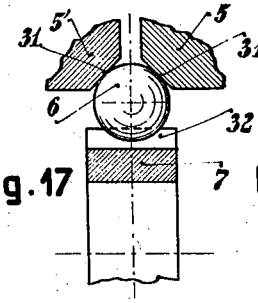

Figs. 16 and 17 show a construction in which there are provided two outer rings 5, 5' having conical pressure surfaces 31 and 31' respectively, while the inner ring 7 is cylindrical and provided with longitudinal grooves 32. When the inner ring is turned relative to the outer ones 5, 5', the latter are driven apart axially. The same result might be obtained by providing the pressure surfaces 31, 31', with inclines, instead of making them simply conical. Instead of these also four pressure exerting rings may be used.

Figure 18:
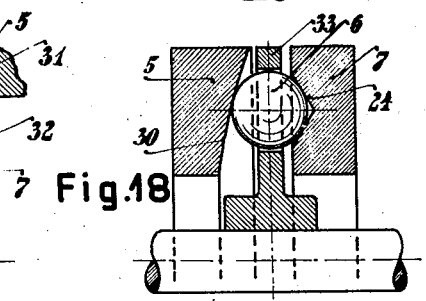

A particular construction is shown in Fig. 18 in which the rolling bodies or balls 6 are guided in a ball cage 33. Such a cage is indispensable, when the pressure exerting surfaces are constructed as shown in Figs. 8 and 10, and also when cylindrical rollers are used instead of balls. This cage may also be used for operating the pressure exerting device as shown in Fig. 18. As the shaft connected with the cage 33 is turned the ball 6 tends to roll along the surface 24 of the ring 7 and the face 30 of the ring 5 whereby an axial force is exerted on both rings.

Besides these embodiments many modifications and combinations may be devised.

All these devices have the feature in common that a set of two or more rolling bodies when rolling on appropriate surfaces sets up an axial force which is proportioned to the torque or circumferential force transmitted.

Obviously, other modifications of the shape of the race rings and the rolling bodies as also of the pressure exerting device may be devised without departing from the essence of the present invention.

What I claim is:

1. In a friction gear, a driving shaft, a driven shaft, races and rolling bodies interposed between said shafts, operative connections between said rolling bodies and one of said shafts, one of said races being mounted on said driving shaft, a fixed race against which said rolling bodies bear, and a pressure device interposed between the drive shaft and driving race adapted to produce the required pressure between said races and rolling bodies, and acting directly only on the race mounted on said driving shaft, transmitting its entire pressure to said race.

2. In a friction gear, a driving shaft, a driven shaft, races and rolling bodies interposed between said shafts, operative connections between said rolling bodies and one of said shafts, one of said races being loosely mounted on said driving shaft, so as to be capable of rotation thereon, a fixed race against which said rolling bodies bear, and a pressure device interposed between the drive shaft and driving race for coupling said driving shaft with said race and adapted to produce the required pressure between said rolling bodies and races, said pressure device acting directly only upon the race mounted on said driving shaft, transmitting its entire pressure thereto, thereby coupling it with said driving shaft.

3. In a friction gear, a driving shaft, a driven shaft, races and rolling bodies interposed between said shafts, operative connections between said rolling bodies and one of said shafts, one of said races being loosely mounted on said driving shaft, so as to be capable to rotate thereon, a fixed race against which said rolling bodies bear, a pressure device interposed between the drive shaft and driving race for coupling said driving shaft with said race and adapted to produce the required pressure between said rolling bodies and races, said pressure device acting only upon said loosely mounted race transmitting its entire pressure thereto, and means for equally distributing the pressure exerted by said pressure device along the whole circumference of said race.

4. In a friction gear, a driving shaft, a driven shaft, races and rolling bodies interposed between said shafts, operative connections between said rolling bodies and one of said shafts, one of said races being loosely mounted on said driving shaft and capable to rotate thereon, a fixed race against which said rolling bodies bear, a pressure device interposed between the drive shaft and driving race adapted to produce the required pressure between said races and rolling bodies and comprising a number of pressure plates each having inclined faces arranged in series, and a pair of balls between two adjacent inclined faces, the center line of said balls between two adjacent pairs being at an angle relative to each other, so as to allow free adjustment in every direction.

5. The combination as set forth in claim 4, in which the inclined faces in said pressure plates are shaped with varying pitch for varying the axial pressure on said races.

6. In a friction gear, a driving shaft, a driven shaft, races and rolling bodies interposed between said shafts, operative connections between said rolling bodies and one of said shafts, one of said races being mounted on said driving shaft, a second race against which said rolling bodies bear and a pressure device interposed between the drive shaft and driving race adapted to produce the required pressure between said races and rolling bodies, and acting directly only on the race mounted on said driving shaft, transmitting its entire pressure to said race.

In testimony whereof I affix my signature.

ING. RICHARD ERBAN.